US005897196A

United States Patent [19]

Soskind et al.

[11] Patent Number: 5,897,196

[45] Date of Patent: Apr. 27, 1999

[54] MOTOR VEHICLE HEADLAMP

[75] Inventors: Yakov G. Soskind, Columbus; Michael J. Dorogi, Vallonia, both of Ind.

[73] Assignee: Osram Sylvania Inc., Danvers, Mass.

[21] Appl. No.: 08/625,618

[22] Filed: Mar. 29, 1996

[51] Int. Cl.[6] .......... B60Q 1/04

[52] U.S. Cl. .......... 362/61; 362/297; 362/308; 362/346

[58] Field of Search .......... 362/61, 80, 297, 362/308, 311, 328, 346

[56] References Cited

U.S. PATENT DOCUMENTS

| | | | |
|---|---|---|---|
| 1,393,573 | 10/1921 | Ritter . | |
| 1,758,041 | 5/1930 | Heymann . | |
| 4,066,887 | 1/1978 | Levis | 362/341 |
| 5,014,166 | 5/1991 | Draper | 362/61 |
| 5,440,456 | 8/1995 | Bertling | 362/61 |
| 5,450,294 | 9/1995 | Hogrefe | 362/61 |

FOREIGN PATENT DOCUMENTS

| | | |
|---|---|---|
| 535657 | 12/1921 | Germany . |
| 656609 | 1/1938 | Germany . |
| 188367 | 3/1937 | Switzerland . |

*Primary Examiner*—Y My Quach
*Attorney, Agent, or Firm*—William E. Meyer

[57] ABSTRACT

A vehicle headlamp may be formed from a light source; a divergent lens; and a reflector facing in a forward direction to the lens. The reflector has one or more first regions, and one or more second regions. The first region is a section of an ellipsoid of revolution with one focal point coincident with the light source, and one focal point located at the first focal point of the lens. The second regions have a surface with an elliptical vertical cross section having a first focal point coincident with the light source and a second focal point coincident with the first focal point of the lens. The second surface additionally has a horizontal axial cross section having a first focal point coincident with the light source and a second focal point axially offset from the first focal point of the lens. The horizontal axial cross section may be elliptical, parabolic or hyperbolic. Light from the first regions is convenient to form the beam hot spot. Meanwhile, light from the second regions is convenient to form the beam spread. In total the system provides a headlamp with a short axial dimension and a small frontal opening while meeting headlamp beam standards.

11 Claims, 14 Drawing Sheets

MOTOR VEHICLE HEADLAMP

BACKGROUND OF THE INVENTION

1. Field of the Invention

The present invention relates to electric lamps, and in particular vehicle headlamps. Still more particular, the invention relates to headlamps having compound optical elements.

2. Description of the Background Art

Headlamps are designed to accomplish several goals at once. They must illuminate both near and far regions in front of a driver, without detrimentally effecting the vision of other drivers. This is accomplished at a minimum by forming a beam pattern that complies with automotive lighting requirements. At the same time, styling, aerodynamics, size, weight and cost are factors that must also be dealt with. Beam patterns are then constructed with variety of considerations at once. The beam pattern includes a region of high intensity called a hot spot that is normally built by effectively overlaying numerous reflected images from the light source. Reflectors with relatively long focal lengths, have small source images that can be grouped in an angularly narrow region to form the hot spot. At the same time, a headlamp high beam for example, must spread some light right, left, above and below the hot spot to broaden the driver's view. Reflectors with short focal lengths, have large source images that can be spread over a broad area. The conflict between short and long focal lengths is apparent. Further, headlamps should efficiently use the available light, so the source may be designed for longevity, or energy efficiency. Lamp efficiency is achieved by intercepting and reflecting a greater portion of the light from around the light source. Capturing more of the light by reflecting it from more of the surrounding spherical area, means the light is necessarily captured at a greater variety of angles. It also means relatively less spherical area is available to direct the light through to the field to be illuminated. All these factors complicate the design.

In a typical prior art sealed beam headlamp with a parabolic reflector and refractive cover lens, the light source is disposed near the focus of the reflector, so rays emitted from the light source are reflected forward, parallel to the axis of the paraboloid. The parallel beams are then refracted by the prisms and lenses of the cover lens to form a predetermined beam pattern. The design relies on a relatively large focal length to form the necessary hot spot in the beam, while beam spread is achieved by the lens optics. For efficiency, a relatively large reflector area is used to gain the necessary solid angle. The design is not particularly adaptable to fit with styling variations in the surrounding vehicle body. The reduction of the overall height for styling, and inclination of the lens surface for aerodynamics cause a significant reduction in the overall headlamp efficiency. The reduced height can, to a degree, be offset by increased width, but only with diminishing returns. Usually the total frontal area is increased in this trade off, and the large frontal area is of itself a styling and aerodynamic detriment. It is then not practical to make an efficient, parabolic reflector type headlamp with a small frontal area.

Currently, there is a trend to move the beam forming optics from the cover lens to the reflector. The headlamp then has a reflector with a complex surface, such as a compound-curvature or multifaceted surface, and a clear cover lens. Since, the clear cover lens has little or no optical effect on the beam pattern, it can be configured to carry all the styling and aerodynamic constraints. The problems with focal length tradeoffs and the degree of enclosure are approximately the same in both the parabolic reflector/refractive lens, and the complex/clear lens type headlamps. The later then still require a relatively large frontal area.

To increase efficient use of the light from the filament and at the same time allow for a small frontal area, one method is to use a projector type lamp. FIG. 1 shows a schematic side view of a projector type headlamp. These headlamps use an elliptical reflector to intercept a large portion of the light from around the light source. The large amount of collected light is then directed to a converging lens that collimates and spreads the available light. The light source is placed to coincide with one focal point of the elliptical reflector to thereby project light through a narrow region approximately at a second focal point. A mask is usually placed in the vicinity of the second focal point to block light and thereby helps define some of the beam pattern edges (cut off). The mask removes available light from being usefully projected. The light is then passed through a small reflector opening to concentrate the flux on the converging lens. The image of the filament produced by the elliptical reflector is then located at the second focal point, coinciding with the first focal point of the positive converging lens (between the reflector and lens). The rays from the filament image are then refracted by the converging lens to form the beam pattern. An optically clear cover lens may be placed in front of the converging lens for styling and aerodynamics.

A typical projector headlamp design requires a relatively long axial dimension to span the distance between the two focal points and include the reflector behind the one focal point and the lens in front of the other. The headlamp then extends deep under the hood and competes for valuable internal space. There is then a need for a headlamp forming a beam pattern including hot spot, and spread regions wherein the headlamp has a relatively small frontal area, and a relatively short axial extension.

SUMMARY OF THE INVENTION

A vehicle headlamp may be formed from a light source; a divergent lens; and a reflector having a reflective surface facing in a forward direction to the light source and the lens to reflect light from the light source towards the lens. The reflector surface has at least a first region comprising a portion of an ellipsoid of revolution, and at least a second region that has at least an elliptical vertical cross section, and a horizontal axial cross section with at least one focal point. The first reflector region is oriented with a first focal point of the reflector located at the light source, and a second focal point located at the first focal point of the lens. The second reflector region is oriented to locate a first focal point of the vertical cross section, and a first focal point of the horizontal cross section at the light source, and a second focal point of the vertical cross section at the first focal point of the lens, and a second focal point of the horizontal cross section axially offset from the first focal point of the lens.

DETAILED DESCRIPTION OF THE PREFERRED EMBODIMENT

Figure 1:
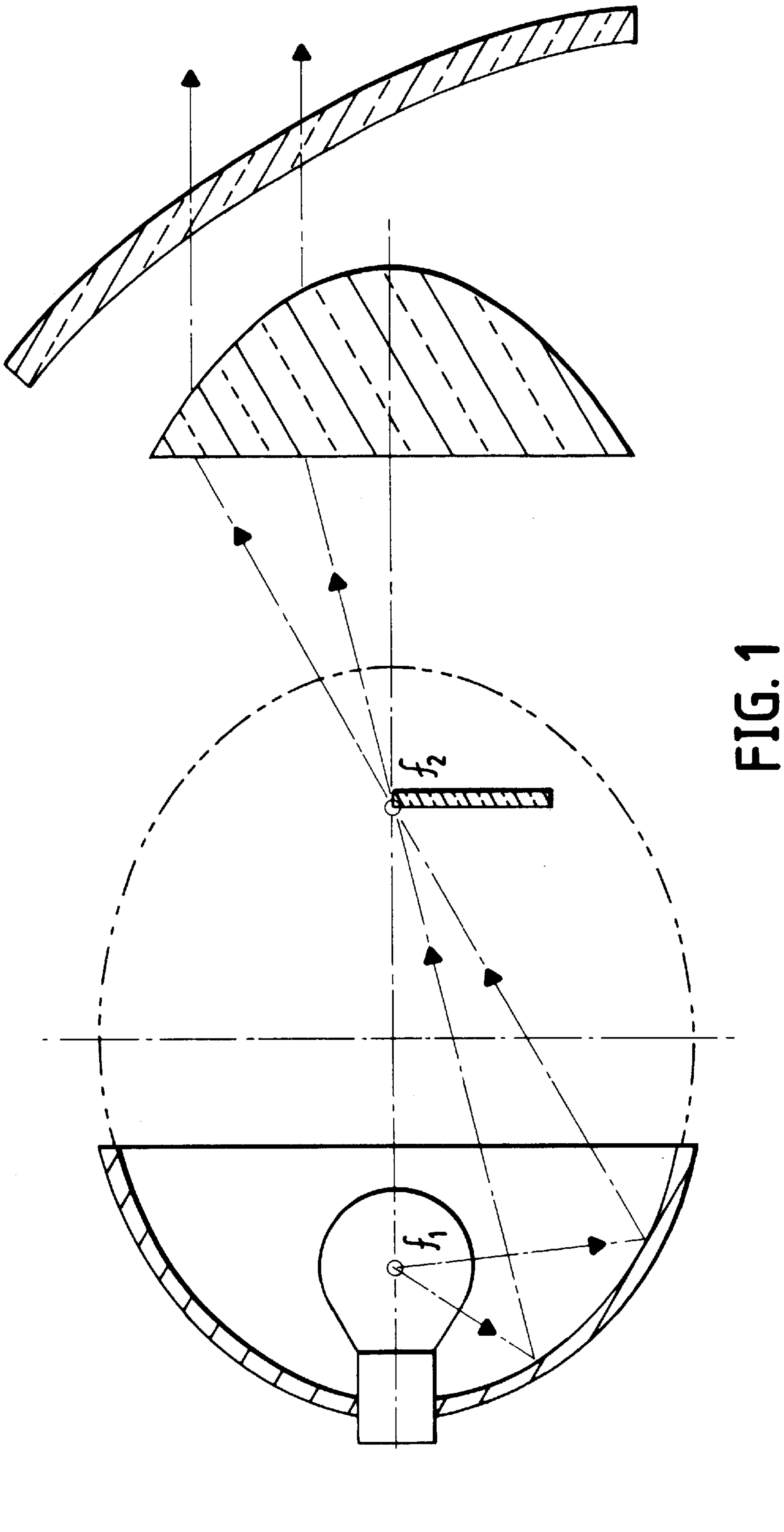
FIG. 1 PRIOR ART
FIG. 1 shows a schematic drawing of a prior art projector type headlamp with an elliptical reflector, shadow mask, converging lens, and clear cover lens.
Figure 2:
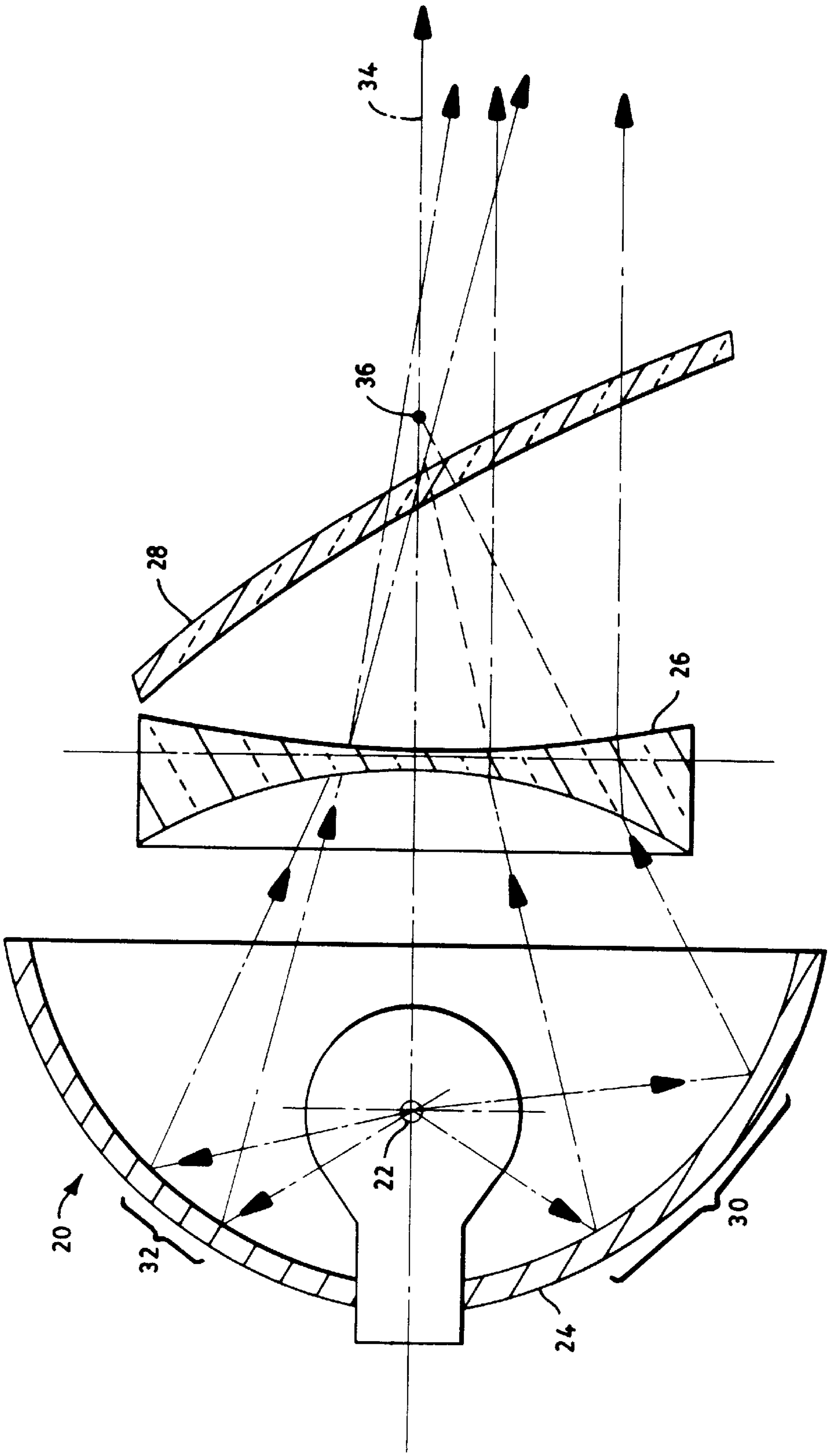
FIG. 2 shows a schematic cross section of a preferred embodiment of a headlamp with a diverging lens and a clear cover lens.

FIG. 2 shows a schematic cross section of a preferred embodiment of a vehicle headlamp 20. The headlamp 20 may be formed with a light source 22, a reflector 24, and a diverging lens 26. Additionally a cover lens 28, housing, sealing, aiming and adjustment, attachment and support mechanisms (not shown) may he applied according to design choice as may be necessary and appropriate, as is generally understood in the art of lamp making.

The light source 22 may be any small optical light source, for example one typical of those commonly used in automotive designs. Tungsten filaments are commonly used as headlamp light sources, but electroded and electrodeless high intensity discharge sources may also he used. The preferred light source 22 provides the necessary total number of lumens from a small volume to conveniently form a beam pattern. Useful light sources would include the typical 9004, 9005/6, 9007 and D1 type tungsten halogen lamp capsules. It is understood that a real light source is not a point source, so there is necessarily small spread of light around each ideal ray depending on the source size.

Figure 4:
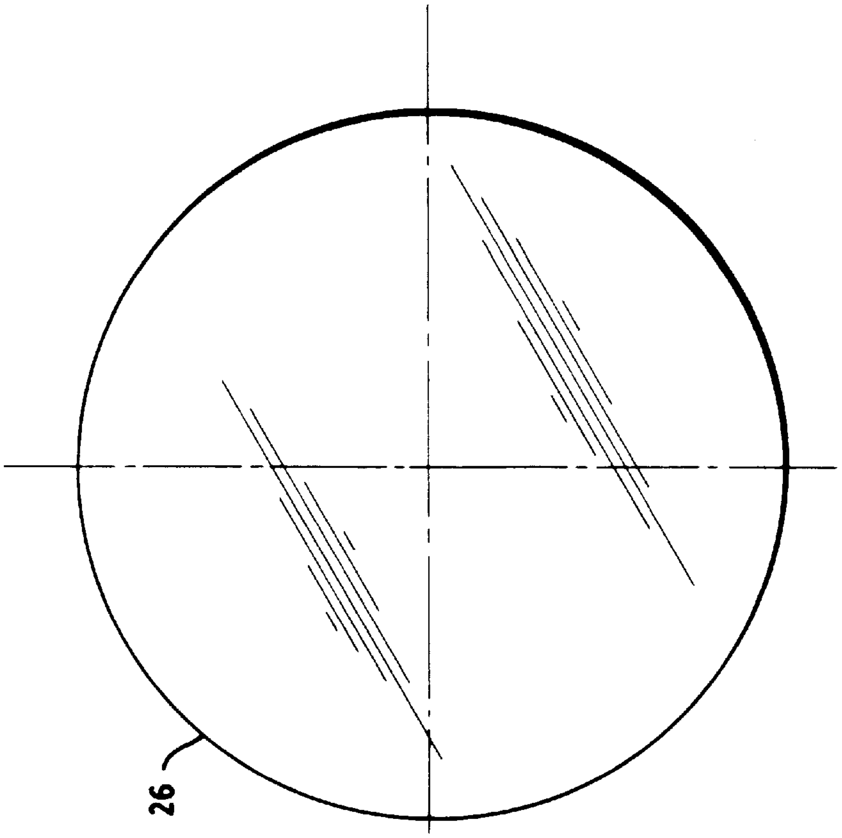
FIG. 4 shows a front view of the divergent lens of FIG. 3.
Figure 3:
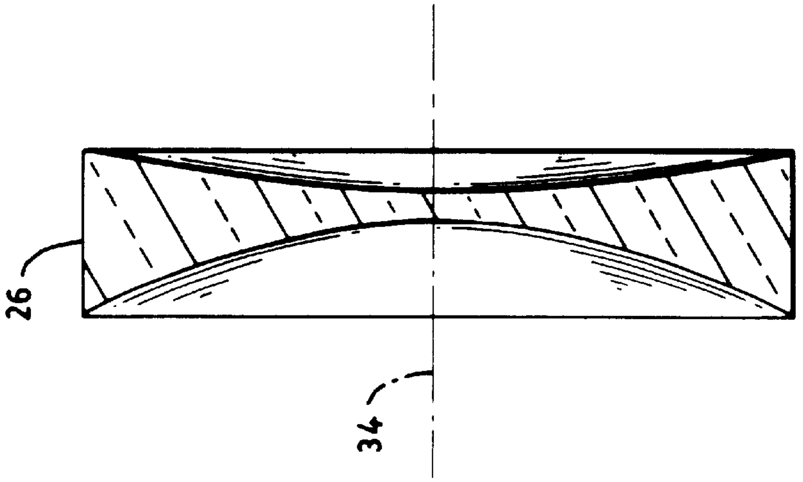
FIG. 3 shows a side cross sectional view of the divergent lens.

FIG. 3 shows a side cross sectional view of the divergent lens 26, and FIG. 4 shows a front view of the same divergent lens 26 of FIG. 3. The preferred lens material is transparent, inexpensive, and has good optical and thermal properties, such as glass, acrylic, or one of a variety of high temperature plastics. Plastic may be accurately and inexpensively formed with relatively high quality optics. While it is possible to form a diverging lens 26 from glass, the preferred lens material is a clear polycarbonate plastic. For manufacturing simplicity, the preferred diverging lens 26 is rotationally symmetric about a central axis 34. Asymmetrical lenses may also be used.

The diverging lens 26, (FIG. 2) has a first focal point 36 as understood and defined in the art of lens making. The first focal point 36, for a diverging lens 26 is imaginary, and for a rotationally symmetric lens is located along the lens axis 34, and on a side of the lens 26 away from the light source 22, meaning here in the region on the forward side of the lens 26.

Figure 6:
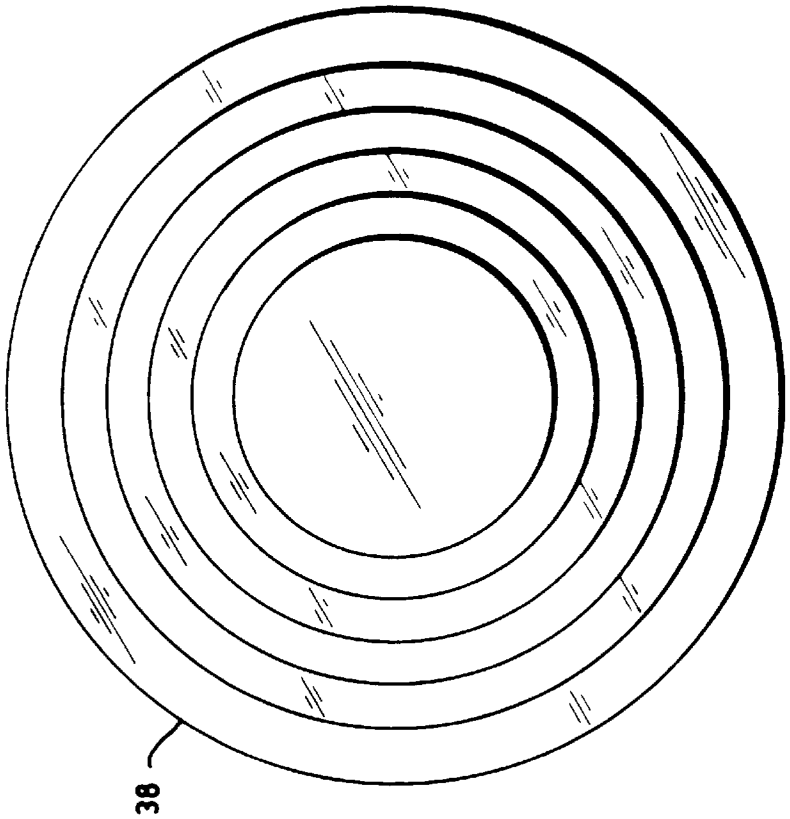
FIG. 6 shows a front view of the divergent lens of FIG. 5.
Figure 5:
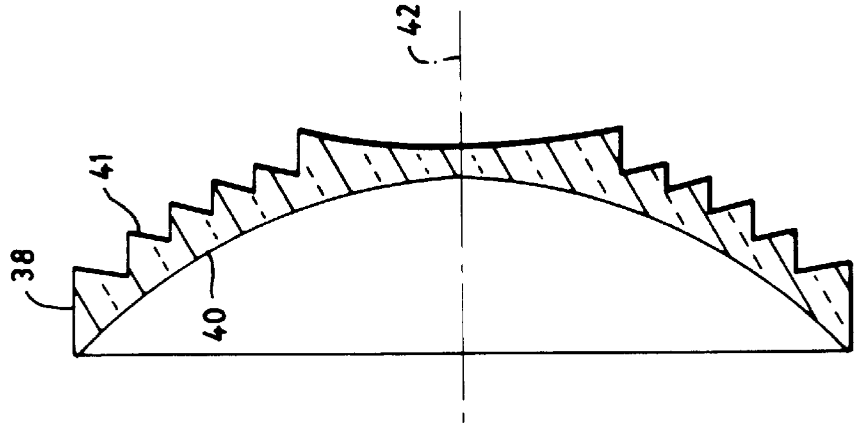
FIG. 5 shows a side cross sectional view of a preferred divergent Fresnel lens.

As is known in the lens making art, there are numerous forms of diverging lens that may be appropriate for use in a headlamp. The lens may be a solid plate concave on one or both sides. The lens may have more of an overall bowl shape. It may have a smooth surface, or a stepped surface. FIG. 5 shows a side cross sectional view of a preferred divergent Fresnel lens 38. FIG. 6 shows a front view of the divergent Fresnel lens 38 of FIG. 5. The preferred Fresnel lens 38 includes a smooth, concave surface 40 on a side facing the light source 22, and the reflector 24. On the side 41 facing away from light source 22, and the reflector 24, the side facing in the forward direction, the lens 38 includes several stepped, refractive regions, rotationally symmetric about a central axis 42 (concentric, divergent Fresnel lens).

The reflector 24, (FIG. 2) may be made of an aluminized, molded plastic as is commonly done. The reflective surface is aligned to face the light source 22 and the lens 26 to reflect light from the light source 22 through the lens 26 in a forward direction. The reflector 24 includes at least a first region 30, and a second region 32. Additional regions may also be included.

Figure 7:
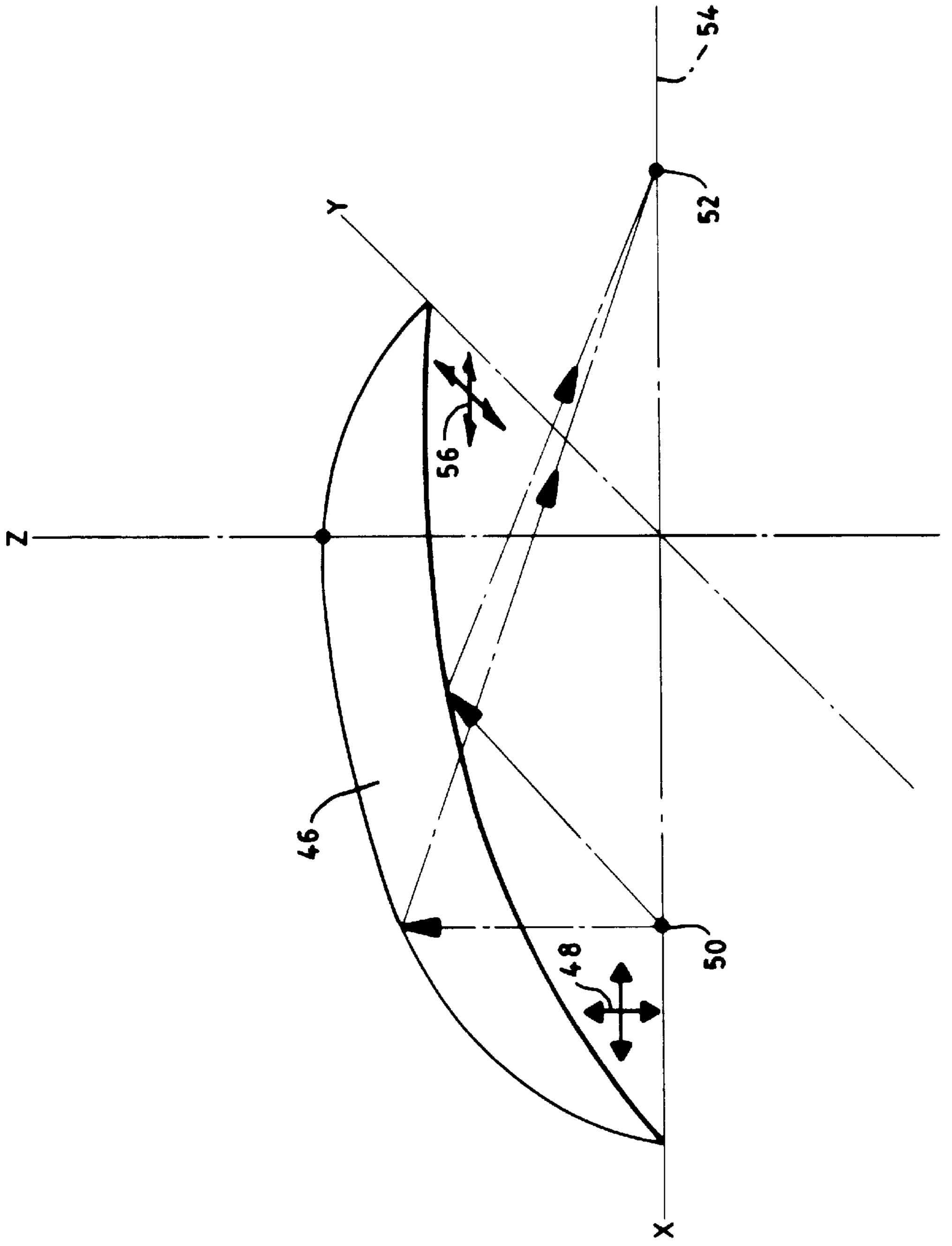
FIG. 7 shows a portion of a type 1 surface.

The reflector 24 is formed with at least a first region 30 taken from an ellipsoid of revolution (type 1 surface). FIG. 7 shows a portion of an ellipsoid of revolution 46. The vertical axial cross section 48 (XZ plane) is elliptical with a first focal point 50. A second focal-point 52 is located along the X axis 54, forward of the first focal point 50. The horizontal axial cross section 56 (XY plane) is also elliptical with a the same first focal point 50, and the same second focal point 52. Axial cross sections taken between the vertical and horizontal are similar. Light rays emitted at the first focal point 50 are then reflected towards the second focal point 52.

Figure 8:
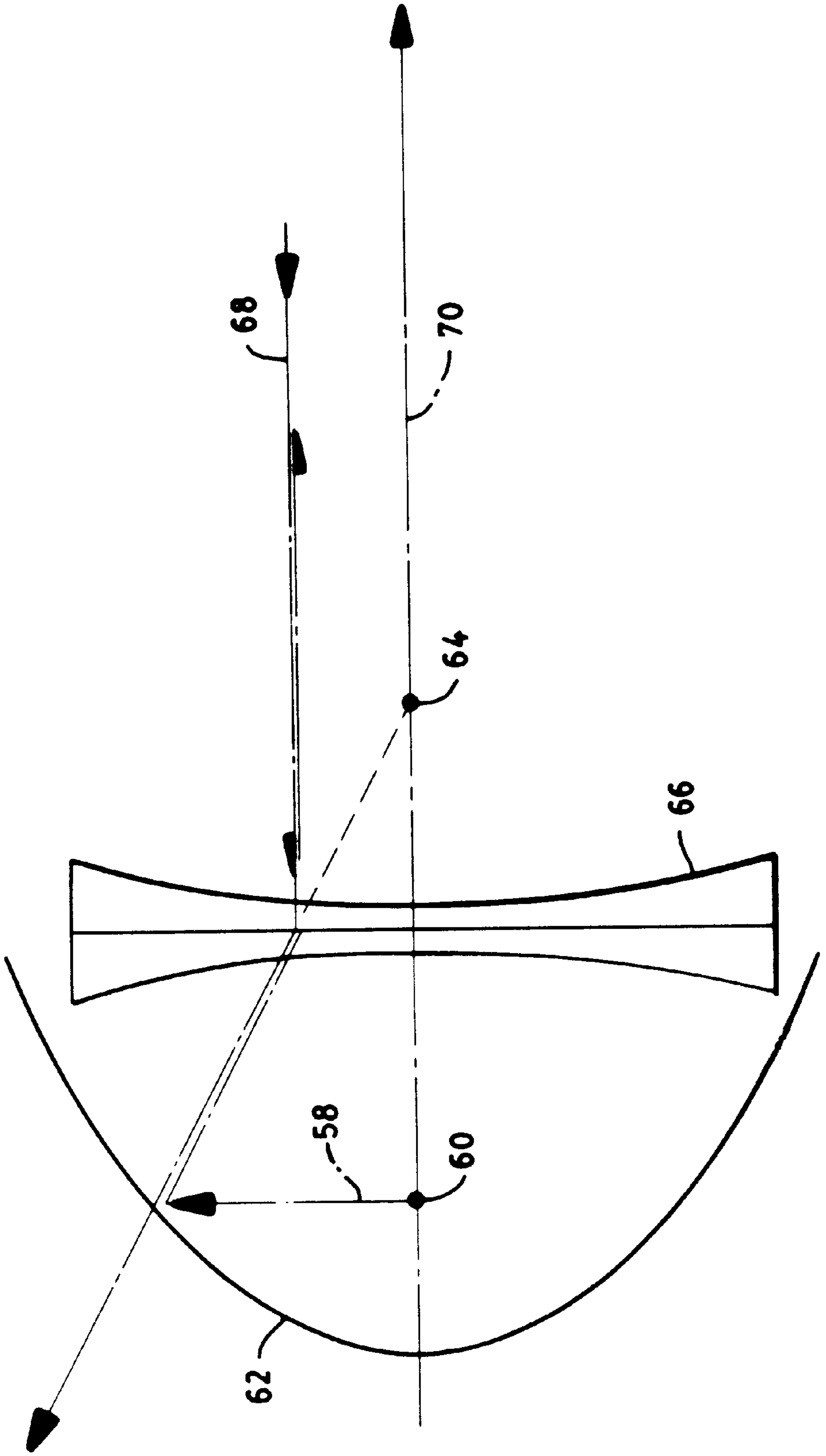
FIG. 8 shows an axial cross section of a schematic optical system.

If a light source is positioned at the first focal point 50, and a diverging lens is positioned so that the second focal point 52 of the reflector is the same as the first focal point of the lens, then light emitted from the light source is substantially collimated. FIG. 8 shows a schematic diagram of an optical system arranged with these conditions. For an ellipsoid of revolution, the vertical and horizontal cross section are similar, so only one is discussed. Ray 58 emitted at the first focal point 60 is reflected on one side of the reflector 62 towards the second focal point 64 of the reflector 62. Ray 58 is refracted by the lens 66, similar to the way an incoming axial ray 68 (presented as a comparison standard) is refracted. Ray 58 is therefore axially collimated, bringing ray 58 into parallel with the axis 70. Collimated rays, such as ray 58, can then be use to build the hot spot. An elliptical reflector section taken from an ellipsoid of revolution with a second focal point at the first focal point of a diverging lens, then yields a collimated beam that can be used for building the hot spot of a headlamp beam.

Figure 9:
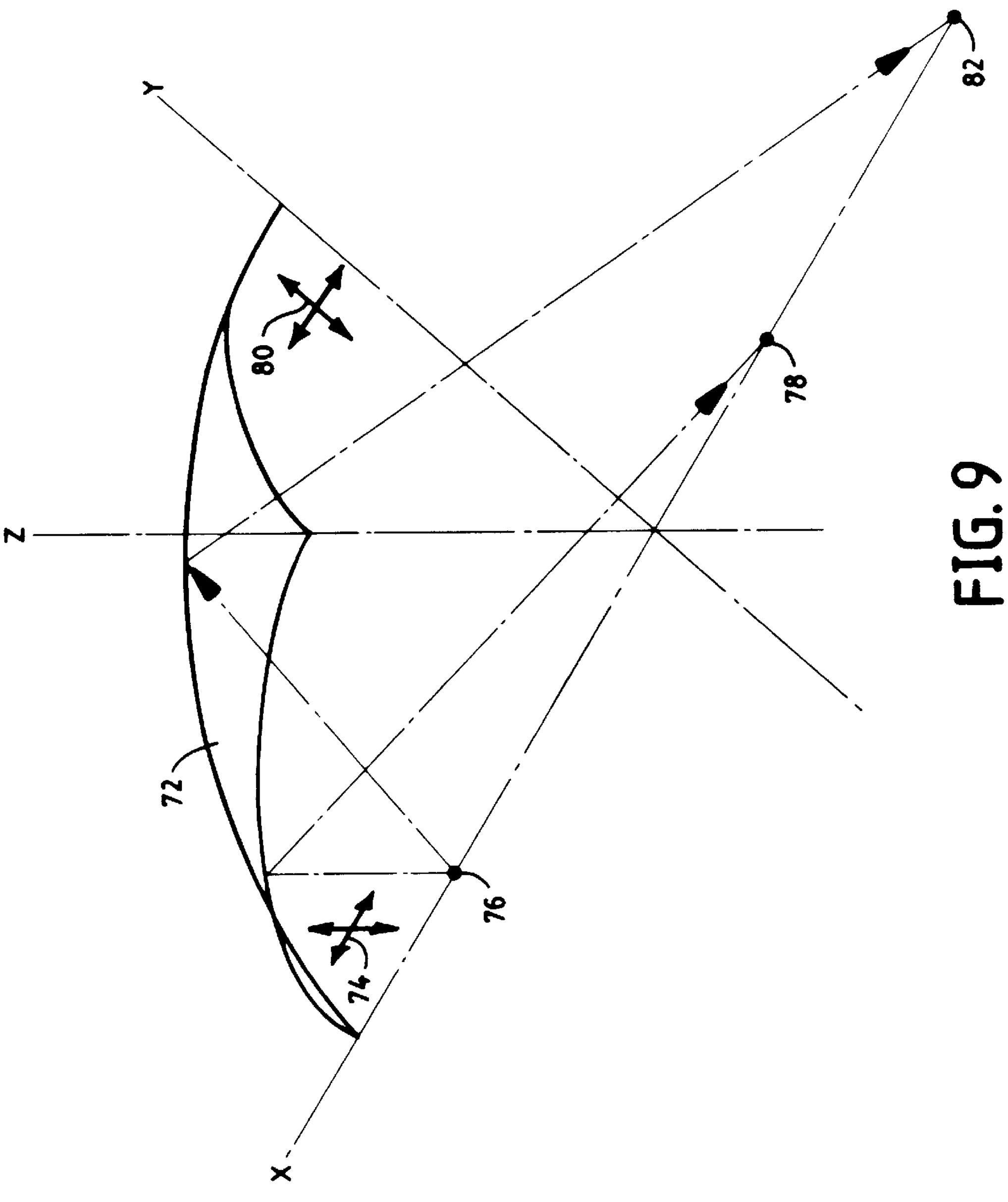
FIG. 9 shows a portion of a type two surface.

The reflector 24 (FIG. 2) further includes at least one region 32 taken from a second surface type. FIG. 9 shows a portion of a type 2 surface 72. The vertical axial cross section 74 (XZ plane) is elliptical with a first focal point 76. A second focal point 78 is located along the X axis, forward of the first focal point 76. The horizontal axial cross section 80 (XY plane) also has a first focal point located at the same first focal point 76. The horizontal axial cross section 80 has a second focal point 82 located along the X axis, but not at the same position as the second focal point 78 associated with the vertical axial cross section 74. Second focal point 82 is then axially off set from the second focal point 78. The horizontal axial cross section 80 may be elliptical, parabolic, or hyperbolic. Axial cross sections taken between the vertical and horizontal may have forms with second focal points located between points 78 and 82.

By positioning a light source at the first focal point 76, and positioning a diverging lens so that the second focal point 78 of the reflector is the same as the first focal point of the lens, then light emitted from the light source is substantially directed in planes parallel to the horizontal. This is similar to the ellipsoid of revolution surface. However, rays in horizontal planes are diverged to the sides, and are generally not parallel to the vertical axial plane 74.

The preferred embodiment of the type two surface is defined by the following equation:

$$aX^3+bXY^2+cXZ^2+dX^2+eY^2+fZ^2+gX=0$$

where

X=the lamp axis dimension

Y=the horizontal dimension

Z=the vertical dimension $a=bc=(1+K_z)(1+K_y)$ $b=(1+K_z)$ $c=(1+K_y)$ $d=bf+ce=(-2)(R_y(1+K_z)+R_z(1+K_y))$ $e=(-2)(R_z)$ $f=(-2)(R_y)$ $g=ef=4(R_z)(R_y)$ $R_y$ and $R_z$ are positive constants representing radii of curvature at the axial intersection of the surface (vertex) in the horizontal and vertical axial planes respectively. $K_y$ and $K_z$ are constants for the horizontal and vertical sectional curves, respectively, with $K_z$ greater than −1.

By selecting a value of $K_z$ greater than −1, the vertical axial cross section is then elliptical. The horizontal cross section, depending on the value of $K_y$ can be elliptical, parabolic or hyperbolic. Since a real light source has real dimension, $R_y$ and $R_z$ need not be exactly equal but may, for example, differ by approximately the size of the light source.

Figure 10:
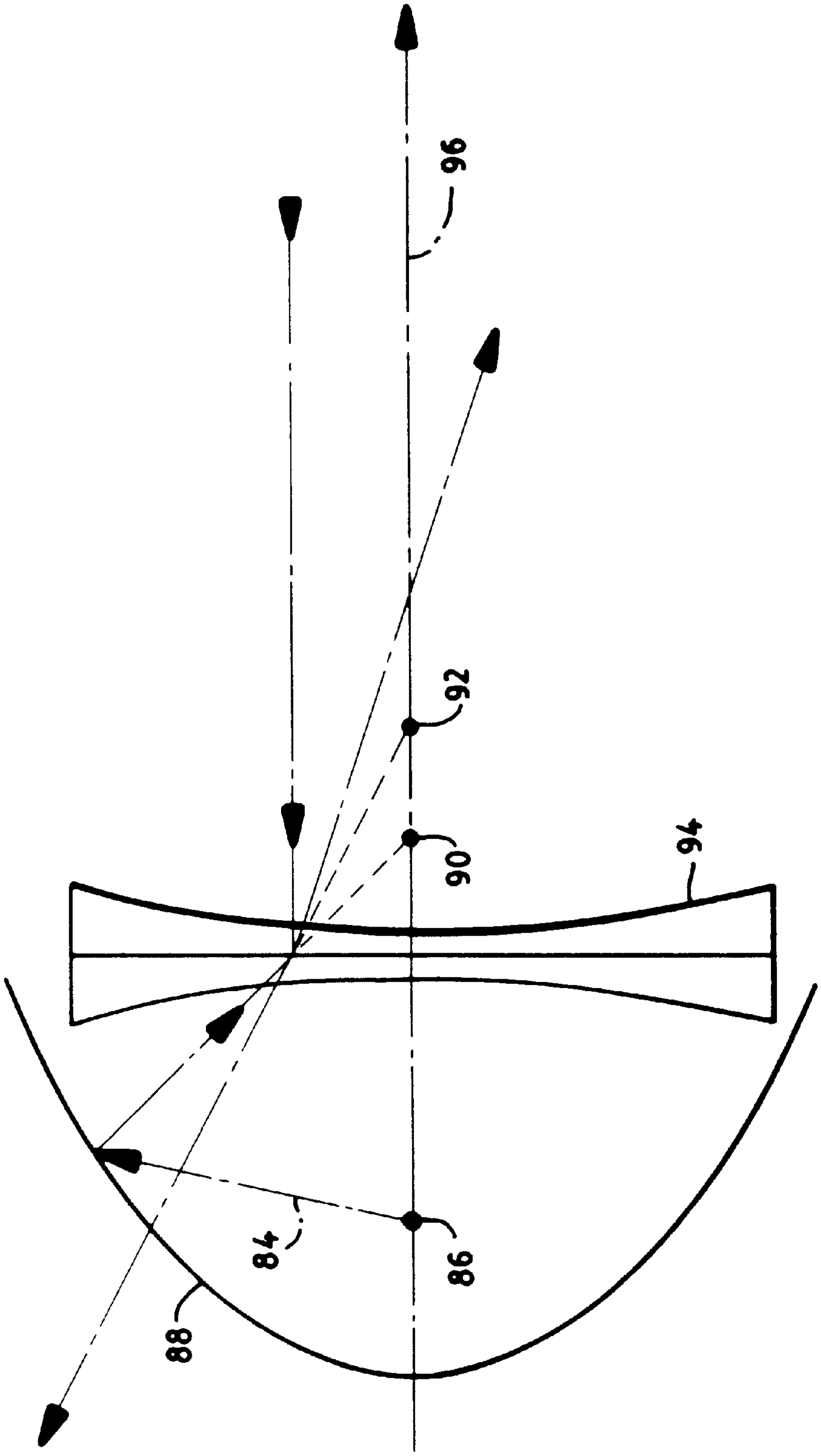
FIGS. 10, 11, 12, and 13, show axial cross sections of schematic optical systems.

FIGS. 10, 11, 12 and 13 show schematic diagrams of optical systems regarding the horizontal axial plane of FIG. 9. In FIG. 10, ray 84 emitted at the first focal point 86 of the horizontal axial cross section is reflected on one side of the reflector 88 towards the second focal point 90 of the reflector 88 that is positioned between a light source at point 86 and the first focal point 92 of the lens 94. Ray 84 is refracted by the lens 94, less than an amount sufficient to bring the ray 84 parallel to the axis 96. Light from the reflector 88 is then directed across the axis 96, and not parallel the axis 96.

Figure 11:
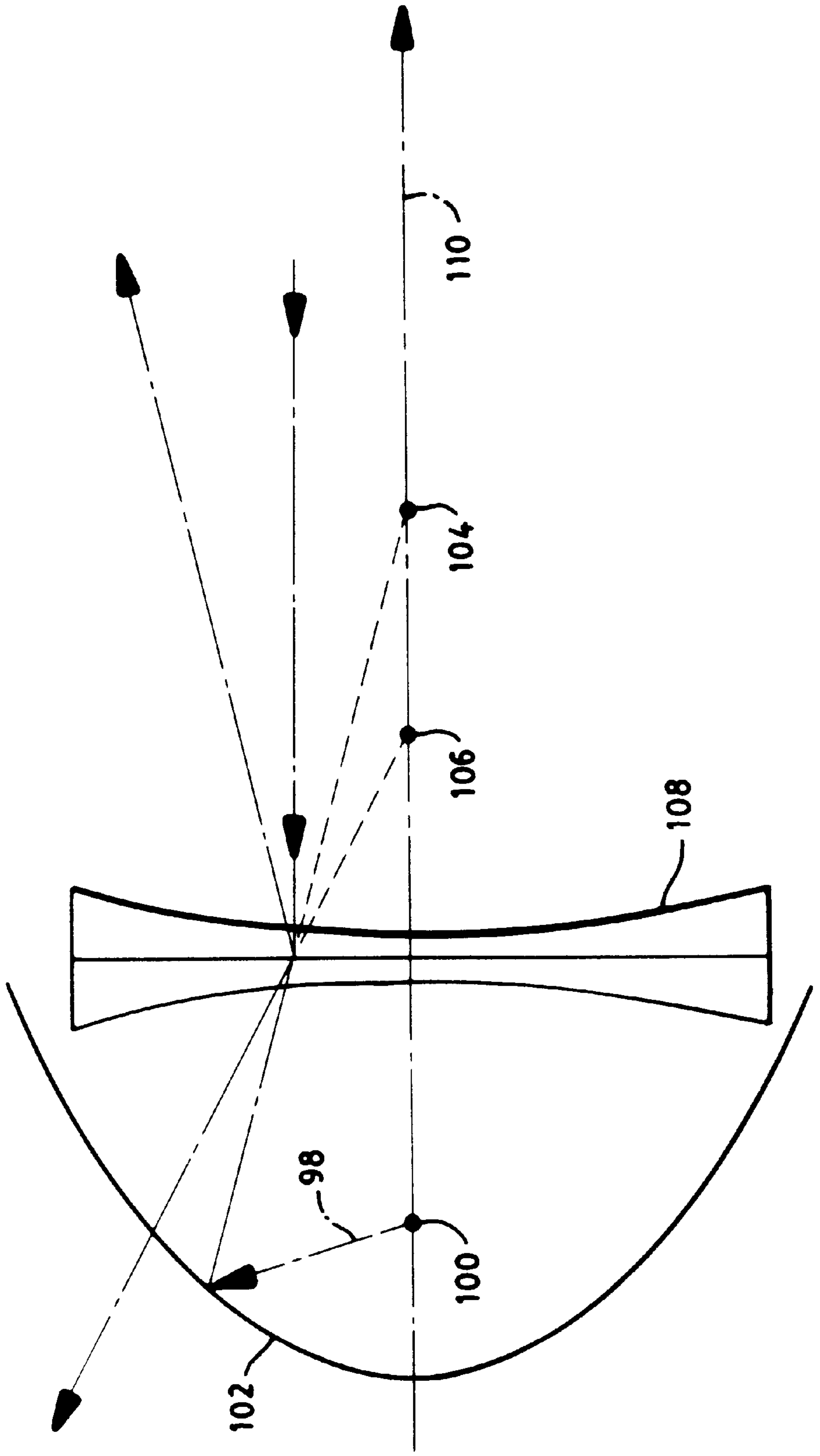

In FIG. 11, ray 98 emitted at the first focal point 100 of the reflector 102 is reflected on one side of the reflector 102 towards the second focal point 104 of the reflector 102 that is positioned beyond the first focal point 106 of the lens 108. Ray 98 is refracted by the lens 108, more than an amount sufficient to bring the ray 98 parallel to the axis 110. Light from the reflector is then directed away from the axis 110, and not parallel the axis 110 .

Figure 12:
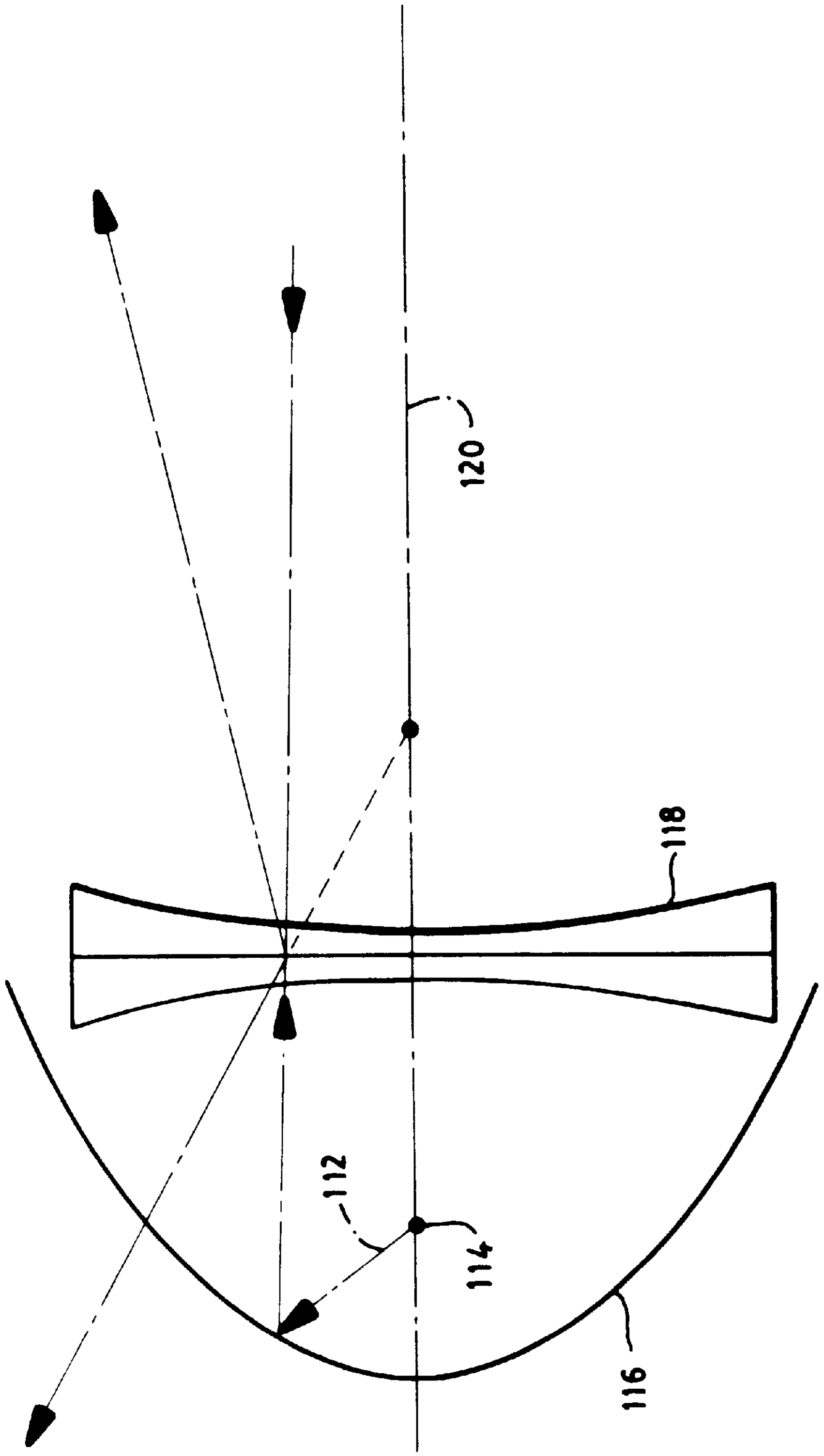

In FIG. 12, ray 112 emitted at the first focal point 114 of the reflector 116 is reflected on one side of the reflector 116 with a parabolic horizontal cross section towards a second focal point (not shown) located at infinity. Ray 112 is then diverged by the lens 118. Light from the reflector is then directed away from the axis 120, and not parallel the axis 120.

Figure 13:
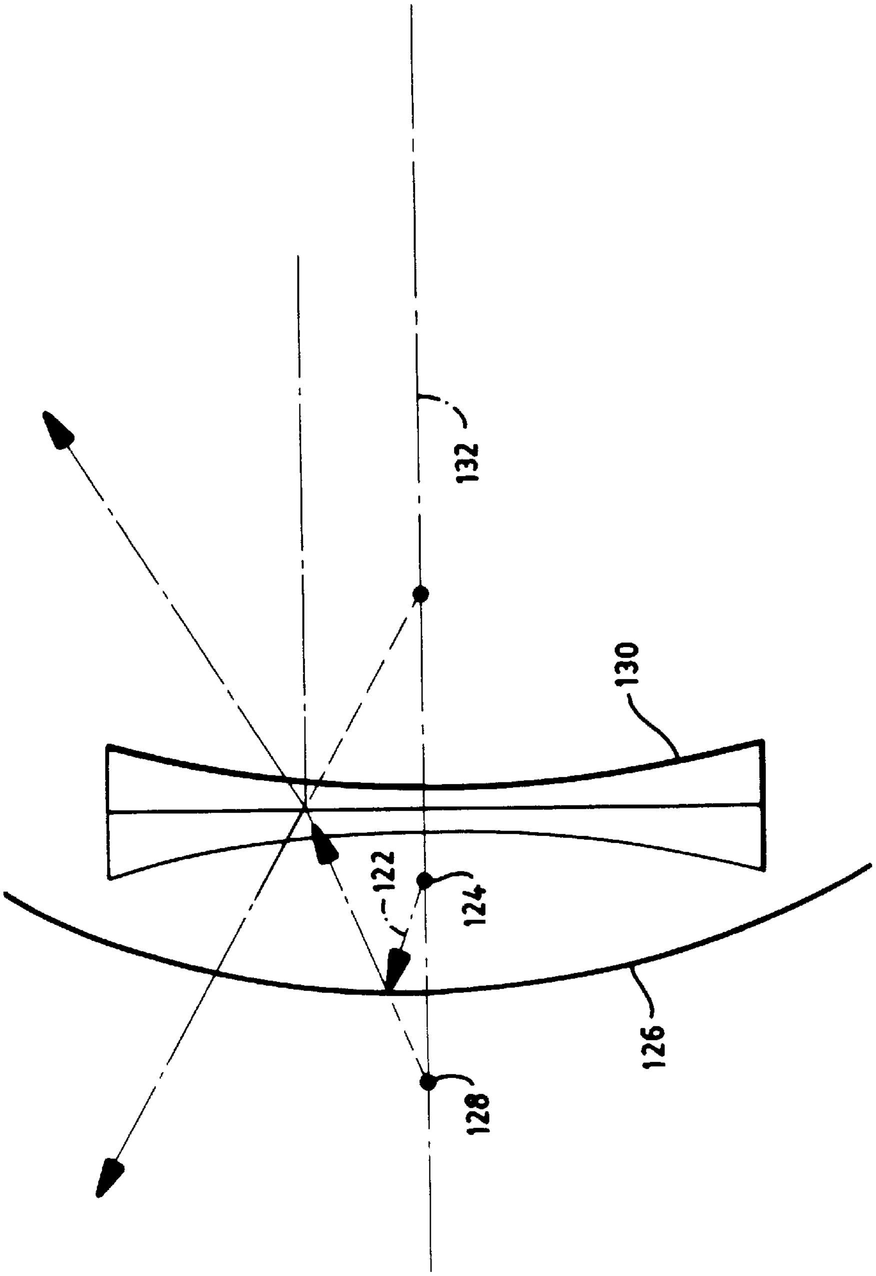

In FIG. 13, ray 122 emitted at the first focal point 124 of the reflector 126 is reflected on one side of the reflector 126 with a hyperbolic horizontal cross section away from a second focal point 128 (imaginary) located behind the reflector 126. Ray 122 is then diverged by the lens 130. Light from the reflector is then directed away from the axis 132, and not parallel the axis 132.

In any case, (FIG. 10, 11, 12, or 13 regarding FIG. 9) the rays 84, 98, 112 and 122 in the horizontal axial plane 86, are not collimated, and spread away from the lens axis. An ellipsoidal, parabolic or hyperbolic reflector section with a horizontal axial cross section whose second focal point is not at the first focal point of the lens, yields a spreading beam that can be used for building portions of the beam away from the hot spot. Portions from the type 2 surface are then useful for forming blend and spread portions of the beam pattern.

Vehicle beam patterns are irregularly shaped with some light needed low on the driver's side, little or no light high on the driver's side, good light in the center low, maximum light in the center just below straight on, and so forth. No single, simple surface provides a correct beam pattern. It is then the art of lamp building to construct beam patterns piecemeal from useful sections of reflectors. Headlamp design here is then carried out by forming one or more type 1 surfaces, and one or more type 2 surfaces, and then selecting sections of the each type and piecing them together to built a satisfactory beam pattern.

Figure 14:
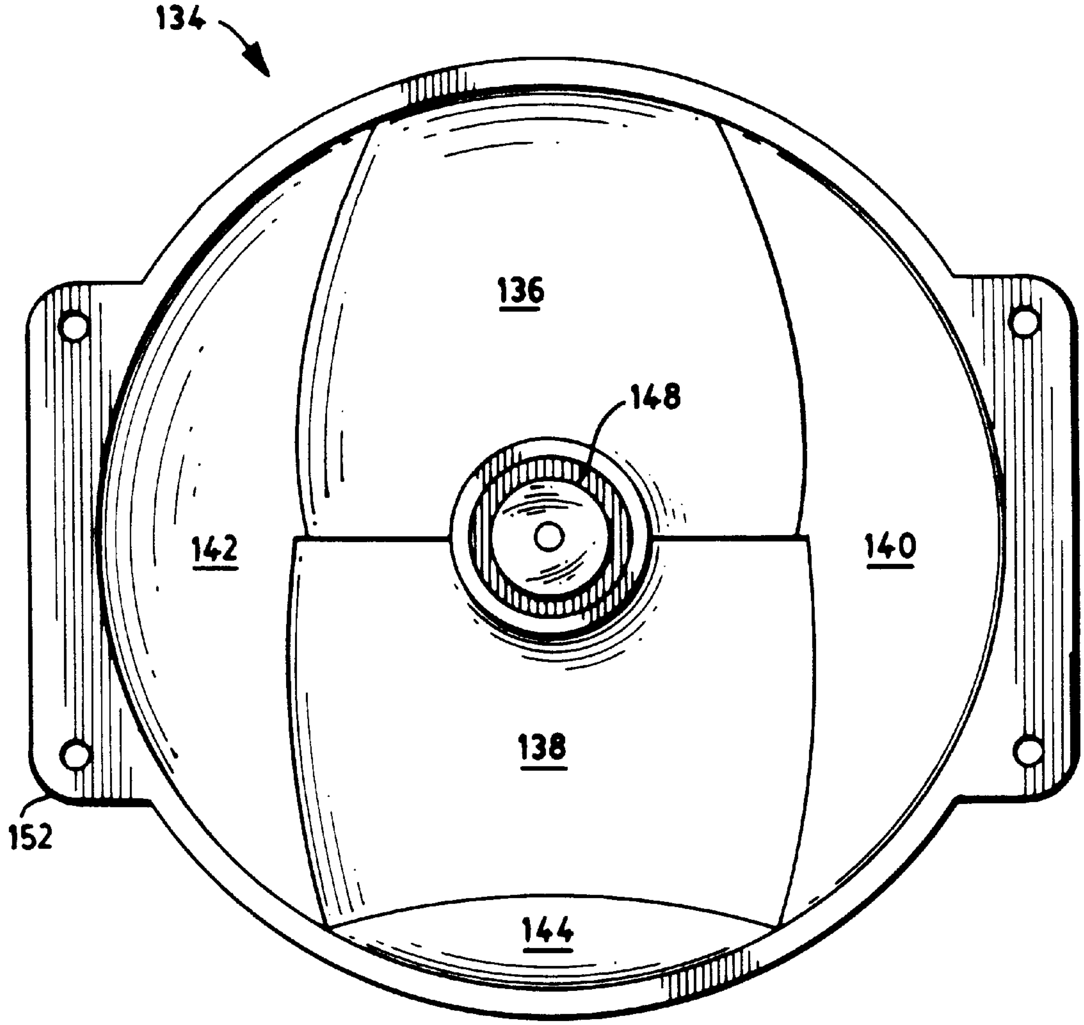
FIG. 14 shows a front view of a reflector.

FIG. 14 shows a front view of a preferred embodiment of a reflector 134. The reflector 134 shows a region 136 extending from the horizontal midline at the reflector center, symmetrically, upwards to the top edge of the reflector 134. A similar region 138 extends from the horizontal midline to two points along the lower edge of the reflector 134. Formed respectively to the right and to the left of the two type 2 regions 136 and 138, are two type 1 regions 140 and 142. A third type 1 region 144 is formed in a segment along the bottom edge of the reflector 134. Regions 140, 142, and 144 are type 1 regions, portions of an ellipsoid of revolution. Regions 136 and 138 are type 2 regions.

In the preferred embodiment, the reflector and lens are fixed relative to each other. The fixed relation is easily accomplished by extending a rigid connection between the two, for example by extending a flange from the reflector, and a flange from the lens, and then rigidly linking the two flanges, for example by studs and bolts.

Figure 15:
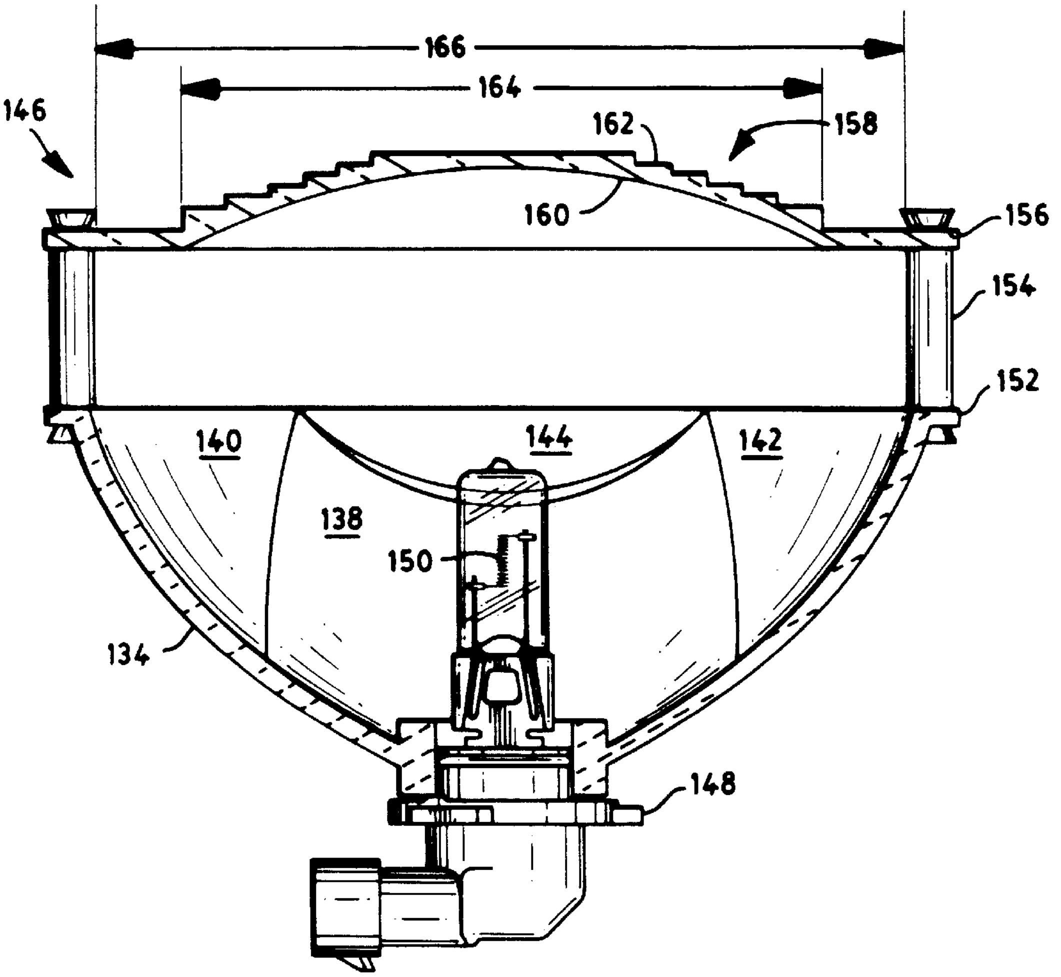
FIG. 15 shows a cross section, top view, of a preferred embodiment of a headlamp light source, reflector and a diverging Fresnel lens.

FIG. 15 shows a top cross sectional view of a preferred embodiment of a headlamp subassembly 146 with a light source, a reflector with type 1 and type 2 regions and a diverging lens. This is the same reflector 134 as seen in FIG. 14. A 9005 type head lamp capsule 148 with an axially aligned filament light source 150 is coupled through the rear of a reflector 134. The reflector 134 has two type two regions 136 (not shown) and 138 and three type 1 regions, 140, 142, and 144 within its reflective area. A reflector flange 152 extends transverse to the lens axis. Attached to the reflector flange 152 are of forward projecting, screwed in place studs 154. The forward most ends of the studs 154 are in turn attached to a lens flange 156. The lens flange 156 also extends transverse to lens axis. The lens flange 156 supports a lens 158 that includes a smooth, concave inside surfaced 160 facing the filament light source 150. The lens 158, on the forward facing side, includes a stepped surface 162 with six, concentric stepped refractive rings. The lens 158 is then a diverging, Fresnel type lens. The lens is located forward of the forward most portion of the reflector 134. The active portion of the lens 158 has a dimension 164 that is less than a dimension 166 measured across the forward most, active portion of the reflector 134, with both dimensions being orthogonal through the lens axis, and parallel to each other. The lens 158 is then smaller than the reflector 134 opening, while receiving all of the light reflected by the reflector 134.

The lamp may be enclosed with a cover lens that may be any clear, and lens free (optically neutral), or nearly lens free cover. The preferred cover is made from a clear polycarbonate or similar material coated with abrasion resistant, and other protective coating as are generally known in the art. The cover lens may be conveniently formed to meet chosen styling and aerodynamic requirements of the vehicle under design.

Figure 16:
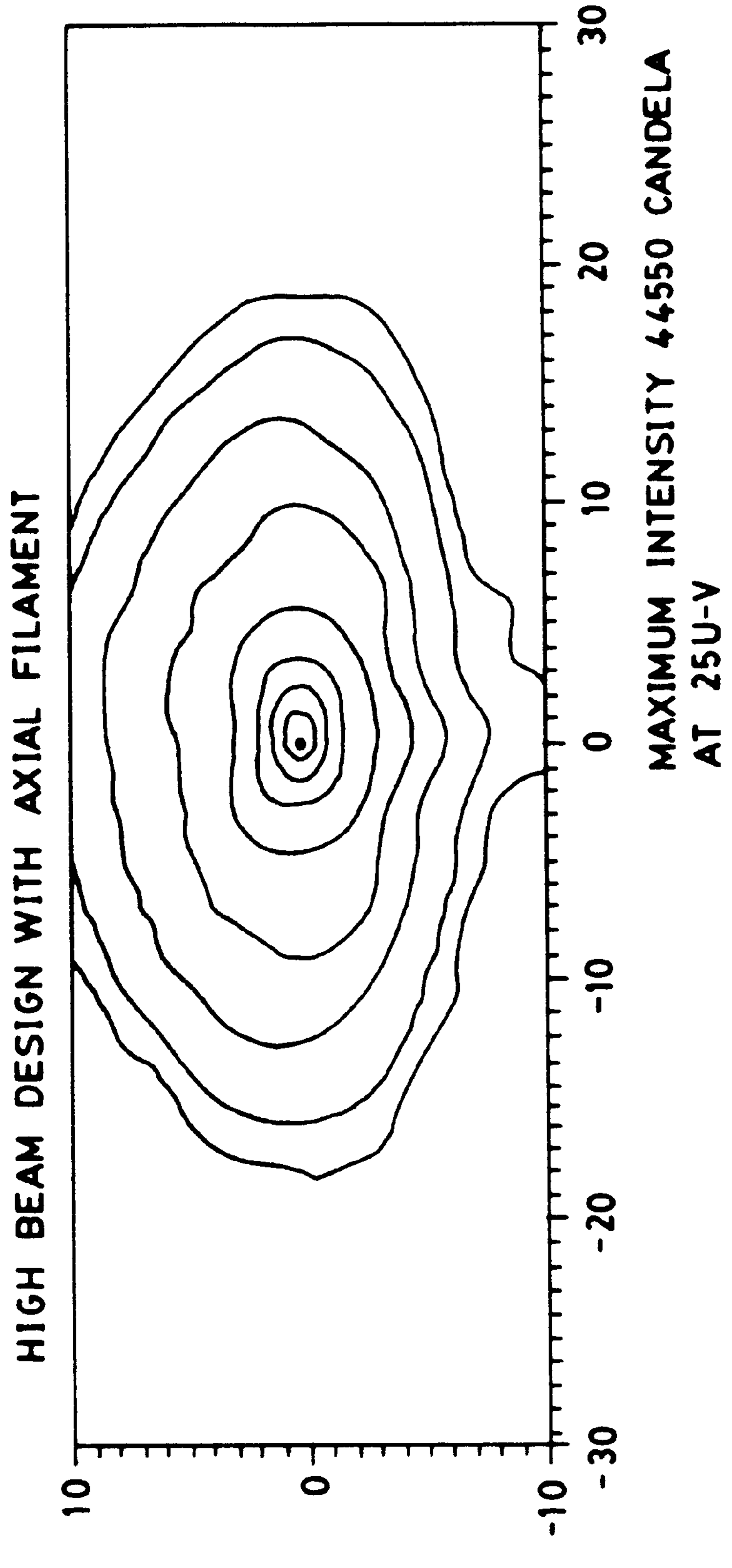
FIG. 16 shows a sample angular luminous intensity distribution from the present invention (isocandella beam pattern).

In operation, the light source is positioned to be at or near the locus of first focal points of the reflector regions, so light emitted from the light source strikes the reflector in the type 1 region(s) and the type 2 region(s). Light is then directed from the type 1 region(s) towards the first focal point of the lens to he axially collimated. Light reflecting from the type 2 region(s) is directed horizontally, but either crosses or spreads away from the vertical axial plane. Light from the reflector type 2 region may then used to form the blend and spread regions of FIG. 16 shows a sample angular luminous intensity distribution from the present invention (isocandella beam pattern). The beam pattern was the result of a headlamp with the structure shown in FIGS. 14 and 15.

It is also common practice to set up an initial lens prescription using ideal geometric forms, such as the segments of the base reflector used to form the complete reflector. In practice, seams are formed along the interfaces of the various segments. The over lap in the final beam pattern from light reflected from adjacent reflector regions may be sufficient to mask any seam lines. In other instances, these seams may cause light or dark streaks in the illuminated field. It is known in practice to submit such ideal prescriptions to computer processing that smoothes out the interface regions, yielding a smooth surface, for example one with continuous first and second derivatives. In this processing the ideal geometric forms are no longer ideal, but only approximations of the ideal. It is also common, for an optical designer to sculpt, according to his preferences, within the limits permitted by a standard, the elements of an optical system to enhance or reduce the amount of light delivered to sections of the illuminated field. Such tweaking of the reflector or lens elements also makes the final optical surfaces difficult to prescribe, in simple terms. It is also understood that exact geometric forms may be approximated by closely similar curves that are not exactly elliptical, parabolic or hyperbolic, the functional result is nonetheless substantially the same. The terms elliptical, parabolic and hyperbolic are then intended here to encompass such approximating forms.

In a working example some of the dimensions were approximately as follows: The reflector was made from a bulk molding plastic compound (BMC), and had a 113.3 millimeter (4.46 inch) inside diameter and a 46.5 millimeter (1.83 inch) axially dimension. The focal length of a type 1 region of the reflector was 25.0 millimeters (0.98 inches). The focal length of a type 2 region of the reflector varied from 23.2 millimeters (0.91 inches) to about 28.5 millimeters (1.12 inches). The light source was a 65 watt halogen bulb (9005 vehicle bulb) with a tungsten filament positioned parallel to the optical axis of the lens. The Fresnel lens had the shape of a circular dome molded from optical grade polycarbonate with a circular disk with two sideways extending flanges used for mounting. The lens had an outer diameter of 90 millimeters (3.54 inches). The inside surface facing the reflector was a smooth, concave spherical surface having a radius of 100 millimeters (3.94 inches). The axial depth of the lens was 13.4 millimeters (0.53 inches). The outer lens surface (forward side, facing away from the reflector) had six concentric refractive diverging zones formed as torodial surfaces. They were arranged concentrically around the center of the lens. The lens thickness varied from 2.0 millimeters (0.08 inches) to 5.4 millimeters (0.21 inches). The geometrical definition of the refractive zones was as follows:

| zone # | $R_{L2}$ (mm) | $h_{min}$ (mm) | $h_{max}$ (mm) |
|---|---|---|---|
| 1 | 170 | 0.0 | 18.5 |
| 2 | 10,000 | 18.5 | 23.5 |
| 3 | 10,000 | 23.5 | 28.5 |
| 4 | 10,000 | 28.5 | 33.5 |
| 5 | 241.9 | 33.5 | 38.5 |
| 6 | 146.7 | 38.5 | 45.0 |

The zones refer to the refractive diverging rings and are numbered from the inside ring 1 to the outside ring 6. $R_{L2}$ is the radius of curvature of respective torodial surface in the median section plane measured in millimeters. The $h_{min}$ is the minimum radial dimension measured in the median plane in millimeters. The $h_{max}$ is the maximum radial dimension of the zone measured in the median plane millimeters.

The lens was aligned to be normal to the reflector axis with the lens center positioned 61.4 millimeters in front of the light source. The axial length of the lamp from the apex of the reflector to the outermost surface of the lens was 88.2 millimeters (3.47 inches), while the weight of the unit was 0.26 kilograms. The diverging lens had a negative focal length of approximately 110 millimeters, so that the axial dimension of the lamp was smaller than a projector type headlamp using a converging lens with a positive focal length of 110 millimeters. The difference was approximately twice the focal length, or 220 millimeters (8.7 inches).

The reflector had five regions defined by the equation disclosed above and the following respective coefficient values:

| region | $R_z$ mm | $R_y$ mm | $K_z$ | $K_y$ |
|---|---|---|---|---|
| 1 | 44.15 | 44.15 | −0.587 | −0.587 |
| 2 | 44.15 | 44.15 | −0.587 | −0.587 |
| 3 | 44.15 | 44.15 | −0.587 | −0.587 |
| 4 | 49.67 | 47.00 | −0.550 | −1.050 |
| 5 | 42.27 | 42.00 | −0.600 | −0.450 |

Each region had elliptical vertical axial cross sections. Regions 1, 2, 3, and 5 had elliptical horizontal axial cross sections. Region 4 had a hyperbolic horizontal axial cross section.

The intensity of the hot spot was above 44,500 candelas and the spread of the light was from −19 to +19 degrees horizontally and from −9 to +12 degrees vertically. The total luminous flux in the output beam was measured to be 770.5 lumens, which corresponds to an efficiency of 45.3 percent for the lamp assembly. FIG. 16 shows a sample angular luminous intensity distribution (isocandella beam pattern) for the lamp assembly using the present invention.

The beam pattern as shown in FIG. 16 meets all of the existing required beam pattern limitations (FMVSS 108). The disclosed dimensions, configurations and embodiments are as examples only, and other suitable configurations and relations may be used to implement the invention.

While there have been shown and described what are at present considered to be the preferred headlamp embodiments of the invention, it will be apparent to those skilled in the art that various changes and modifications can be made herein without departing from the scope of the invention defined by the appended claims. In particular, the design may be adapted to other projector type lamp applications.

What is claimed is:

1. A vehicle headlamp comprising:

a light source;

a divergent lens having a first focal point, and a lens axis passing through the light source and the first focal point of the lens; and a reflector having a reflective surface facing in a forward direction to the light source and the lens to reflect light from the light source towards the lens, the reflective surface having, at least a first region comprising a portion of a type 1 surface, being an ellipsoid of revolution with a respective first and second focal point, the first reflector region being oriented with the first respective focal point located at the light source, and the second respective focal point located at the first focal point of the lens; and and at least a second region comprising a portion of a type 2 surface having an elliptical vertical axial cross section with associated first focal point and second focal point; and having a horizontal axial cross section with associated first focal point and second focal point, the second reflector region being oriented to locate the first focal point of the vertical cross section, and the first focal point of the horizontal cross section at the light source, and the second focal point of the vertical cross section at the first focal point of the lens, and the second focal point of the horizontal cross section axially offset from the first focal point of the lens.

2. The lamp in claim 1, wherein the lens has an active portion having a dimension that is less than a dimension measured across a forward most, active portion of the reflector, with both dimensions being orthogonal through the lens axis, and parallel to each other.

3. The lamp in claim 1, wherein the lens is axially offset from the reflector to be forward of a forwardmost portion of the reflective surface.

4. The headlamp in claim 1, wherein said horizontal cross section of the type 2 surface is elliptical with the second focal point thereof between the light source and the first focal point of the lens.

5. The headlamp in claim 1, wherein said horizontal cross section of the type 2 surface is elliptical with said second focal point thereof between the first focal point of the lens and infinity.

6. The headlamp in claim 1, wherein said horizontal cross section of the type 2 surface is parabolic with said second focal point thereof at infinity.

7. The headlamp in claim 1, wherein said horizontal cross section of the type 2 surface is hyperbolic and the second focal point thereof is an imaginary second focal point behind the reflector.

8. The headlamp in claim 1, wherein said reflective surface having a plurality of regions, each being a portion of the type 1 surface.

9. The headlamp in claim 1, wherein said reflective surface having a plurality of regions, each being a portion of the type 2 surface.

10. A vehicle lamp providing a hot spot and beam spread portions comprising:

a light source sufficient to meet automotive headlight lumen requirements;

a divergent, concentric Fresnel lens having a first focal point, an axis of rotation passing through the light source and the first focal point of the lens, the lens having a dimension orthogonal and through the lens axis, and a reflector with a reflective surface, the reflector being axially offset from the lens, and wherein the lens has an active portion having a dimension that is less than a dimension measured across a forward most, active portion of the reflector, with both dimensions being orthogonal through the lens axis, and parallel to each other, the reflective surface further having at least a first region, a second region and a third region each comprising a portion of a type 1 surface, the type 1 surface being an ellipsoid of revolution with a respective first and second focal point, the first region, second region and third region being oriented so that each respective first focal point is located at the light source, and each respective second focal point is located at the first focal point of the lens; and at least a fourth region and a fifth region each comprising a portion of a type 2 surface, each type 2 surface having an elliptical vertical axial cross section with respectively a first focal point and a second focal point; and having a horizontal axial cross section with respectively a first focal point and a second focal point, the fourth region and the fifth region being oriented to locate respectively the first focal points of the vertical cross sections, and the first focal points of the horizontal cross sections at the light source, and the second focal points of the vertical cross sections at the first focal point of the lens, and the second focal points of the horizontal cross sections displaced from the first focal point of the lens; whereby light from the light source reflected from the first region, from the second region and third region enters the lens to be refracted and then exits the lens along substantially axially parallel lines, and whereby light from the light source reflected from the fourth region and the fifth region enters the lens to be refracted and then exits the lens in substantially horizontally parallel planes.

11. The headlamp in claim 1, wherein at least one type 2 surface is defined by the equation:

$$aX^3+bXY^2+cXZ^2+dX^2+eY^2+fZ^2+gX=0$$

where

X=the lamp axis dimension

Y=the horizontal dimension

Z=the vertical dimension $a=bc=(1+K_z)\ (1+K_y)$ $b=(1+K_z)$ $c=(1+K_y)$ $d=bf+ce=(-2)\ (R_y(1+K_z)+R_z(1+K_y))$ $e=(-2)\ (R_z)$ $f=(-2)\ (R_y)$ $g=ef=4(R_z)\ (R_y)$, $R_y$ and $R_z$ are positive constants representing radii of curvature at the axial intersection of the surface (vertex) in the horizontal and vertical axial planes respectively, and $K_y$ and $K_z$ are constants for the horizontal and vertical sectional curves, respectively, with $K_z$ greater than −1.

* * * * *